US010531131B2

(12) United States Patent
Slaughter et al.

(10) Patent No.: US 10,531,131 B2
(45) Date of Patent: Jan. 7, 2020

(54) DISTRIBUTION AND MANAGEMENT OF CONTENT FROM A MULTI-TIER CONTENT DISTRIBUTION SYSTEM

(71) Applicant: Time Warner Cable Enterprises LLC, New York, NY (US)

(72) Inventors: Justin Slaughter, Highlands Ranch, CO (US); Reuben Patterson, Denver, CO (US); James Panagos, Denver, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/161,480

(22) Filed: May 23, 2016

(65) Prior Publication Data

US 2017/0339438 A1 Nov. 23, 2017

(51) Int. Cl.

| H04N 21/218 | (2011.01) |
|---|---|
| H04N 21/222 | (2011.01) |
| H04N 21/231 | (2011.01) |
| H04N 21/233 | (2011.01) |
| H04N 21/232 | (2011.01) |
| H04N 21/2343 | (2011.01) |
| H04N 21/235 | (2011.01) |
| H04N 21/24 | (2011.01) |
| H04N 21/2747 | (2011.01) |
| H04N 21/433 | (2011.01) |
| H04N 21/462 | (2011.01) |

(Continued)

(52) U.S. Cl.
CPC ....... *H04N 21/23113* (2013.01); *G11B 27/10* (2013.01); *H04N 21/2541* (2013.01); *H04N 21/2543* (2013.01); *H04N 21/26225* (2013.01); *H04N 21/44204* (2013.01); *H04N 21/4627* (2013.01); *H04N 21/47202* (2013.01); *H04N 21/8456* (2013.01)

(58) Field of Classification Search
None
See application file for complete search history.

(56) References Cited

U.S. PATENT DOCUMENTS

2002/0010798 A1 * 1/2002 Ben-Shaul ........ H04L 29/12066
709/247
2002/0110798 A1 * 8/2002 Kucinski ............ G06K 17/0032
434/359

(Continued)

*Primary Examiner* — Jean D Saint Cyr
(74) *Attorney, Agent, or Firm* — Armis IP Law, LLC

(57) ABSTRACT

A multi-tier content distribution system includes a first repository, a second repository, and a third repository from which to distribute content. The first repository serves as a first choice from which to distribute requested content to a requesting party. If the requested content is not available from the first repository, the multi-tier content distribution system attempts retrieval and distribution of the requested content from the second repository, which serves as a backup resource to the first repository. If the requested content is not available from the second repository, the multi-tier content distribution system attempts retrieval and distribution of the requested content from the third repository, which serves as a backup resource to the second repository. The multi-tier content distribution system includes a content management resource operable to selectively populate the second repository with pre-formatted content retrieved from the third repository.

33 Claims, 8 Drawing Sheets

(51) Int. Cl.

| | | |
|---|---|---|
| | *H04N 21/472* | (2011.01) |
| | *H04N 21/442* | (2011.01) |
| | *H04N 21/845* | (2011.01) |
| | *G11B 27/10* | (2006.01) |
| | *H04N 21/2543* | (2011.01) |
| | *H04N 21/262* | (2011.01) |
| | *H04N 21/254* | (2011.01) |
| | *H04N 21/4627* | (2011.01) |

(56) References Cited

U.S. PATENT DOCUMENTS

| | | | | |
|---|---|---|---|---|
| 2003/0005078 | A1* | 1/2003 | Turicchi, Jr. | H04L 69/40 709/217 |
| 2004/0047354 | A1* | 3/2004 | Slater | H04L 41/0896 370/400 |
| 2008/0183876 | A1* | 7/2008 | Duvur | H04L 67/1008 709/228 |
| 2008/0270610 | A1* | 10/2008 | John | G06F 16/40 709/226 |
| 2016/0337426 | A1* | 11/2016 | Shribman | H04L 65/4084 |

* cited by examiner

DISTRIBUTION AND MANAGEMENT OF CONTENT FROM A MULTI-TIER CONTENT DISTRIBUTION SYSTEM

BACKGROUND

Conventional content distribution resources sometimes provide backup storage resources with respect to a primary repository because a respective primary repository is limited in capacity. Upon receiving a request for content, in response to detecting that the requested content is not available from the primary repository, a conventional content distribution system may attempt to retrieve and deliver the requested content from a backup storage resource and or video processor.

BRIEF DESCRIPTION OF EMBODIMENTS

Unfortunately, conventional content distribution resources are prone to providing inefficient delivery of content. For example, any amount of content can be stored in the backup storage resource. However, distribution from the backup storage resource typically requires substantial processing and formatting prior to distribution. Accordingly, retrieval of content from a conventional content distribution system is prone to substantial delays when content is retrieved from a backup storage resource as opposed to a primary repository that stores pre-formatted content for delivery.

Embodiments herein include a novel multi-tier content distribution system for more efficient and/or more expedient delivery of content to multiple communication devices in a network environment.

More specifically, according to one embodiment, a multi-tier content distribution system includes a first repository, a second repository, and a third repository from which to distribute content. During operation, the first repository in the multi-tier content distribution system serves as a first choice from which to distribute requested content to a requesting party. If the requested content is not available from the first repository, the multi-tier content distribution system attempts retrieval and distribution of the requested content from the second repository, which serves as a second choice from which to distribute the requested content. Thus, the second repository serves as a backup resource with respect to the first repository. Further, if the requested content is not available from the second repository, the multi-tier content distribution system attempts retrieval and distribution of the requested content from the third repository, which serves as a backup resource to the second repository.

In one embodiment, the multi-tier content distribution system includes one or more access control resources operable to attempt retrieval of requested content in accordance with a predefined access order as discussed above. For example, in response to receiving a request for content, the access control resource first attempts to retrieve the requested content from the first repository and, if the requested content is unavailable from the first repository, the access control resource (second) attempts to retrieve the requested content from the second repository and, if the request content is unavailable from the second repository, the access control resource (third) attempts to retrieve the requested content from the third repository. Thus, embodiments herein include a trial and error way of retrieving and distributing content.

Note that the multi-tier content distribution system as described herein can include any number of repositories. The discussed embodiments of including a first repository, a second repository, and a third repository are shown by way of non-limiting example for illustrative purposes.

In accordance with further embodiments, note that the third repository can be configured to store many or all available titles of content, each of which require processing and formatting prior to distribution to respective users operating communication devices. Recall that the first repository stores first content and the second repository stores second content. By way of non-limiting example, the third repository can be configured to store a copy of first content stored in the first repository and a copy of second content stored in the second repository. However, as previously discussed, the multi-tier content distribution system attempts retrieval of the content from the first repository as well as from the second repository prior to falling back on distribution of requested content from the third repository.

In still further embodiments, the content stored in the first repository and the second repository includes pre-formatted content for immediate distribution to requesting client devices. Distribution of the content from the third repository is less desirable than distribution from the first repository or the second repository because the content in the third repository requires formatting (processing) before such content is available for retrieval by the communication devices. Thus, delivery of respective content from the third repository may be delayed in comparison to delivery of content from the first repository or the second repository.

To provide more efficient delivery of content to the communication devices from the multiple repositories, the multi-tier content distribution system includes a content management resource operable to selectively populate the second repository with pre-formatted content derived from the content stored in the third repository.

In accordance with further embodiments, the multi-tier content distribution system or other suitable resource keeps track of or receives content consumption information indicating a particular title of content popularly retrieved from the third repository because such content is not stored in the first repository or the second repository. In accordance with constantly updated content consumption information indicating trending content consumption, most popular content consumption, expected content consumption, etc., the content management resource initiates updating the second repository to include specified titles of content available from the third repository.

Thus, in one embodiment, depending on a trend or expected trend of users retrieving portions of content stored in the third repository, the content management resource initiates storage of a copy of the popularly retrieved content from the third repository to the second repository. Based on such operations of updating the content in the second repository, instead of having to retrieve the identified more popular content from the third repository, the client devices are able to retrieve the popular content from the second repository.

In accordance with further embodiments, as previously discussed, the content management resource (and/or corresponding video packager resource) pre-formats the portions of content prior to storage in the second repository. Pre-formatting of the content in the second repository (and/or first repository if desired) supports or provides for immediate on-demand distribution to retrieving client devices. Servicing of a respective request from the third repository requires formatting prior to distribution of such content to a respective requested. Accordingly, distribution from the third repository is susceptible to delays in comparison to distribution of content from the first repository and the second repository; distribution of content from the second repository eliminates such delays because the content is already formatted (such as in multiple segments) for distribution.

In accordance with yet further embodiments, the multi-tier content distribution system or other suitable resource produces content access information (such as a generated manifest file) indicating an order in which to sequentially retrieve the multiple retrievable segments for a particular title of content stored in the second repository. In other words, the content management resource or other suitable resource can be configured to produce content access information (manifest file) indicating an order in which to sequentially retrieve the multiple retrievable segments to playback a corresponding title of content such as video of moving images and corresponding sound. In such an instance, a communication device retrieves the content access information and then uses the content access information to retrieve segments of the particular title of content from the second repository.

As previously discussed, over time, the most popular content consumed by respective client devices typically changes. To accommodate the change in content consumption demands for viewing different titles of content, the content management resource as described herein is operable to replace old content stored in the second repository with new content. For example, assume that a first title of content currently stored in the second repository becomes less popular than a second title of content commonly stored and retrieved from the third repository. In such an instance, the content management resource initiates replacement of the first title of content in the second repository with the more popular second title of content.

In this manner, old titles of content that are less often requested for viewing are replaced with newer titles that are more often requested or expected to be requested for viewing by respective users.

These and other more specific embodiments are disclosed in more detail below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content form a multi-tier content distribution system. The instructions, when executed by computer processor hardware, cause the computer processor hardware (such as one or more processor devices) to: receive popularity information indicating content to retrieve and store in a first supplemental repository, the first supplemental repository being a backup resource from which to distribute content not stored in a primary repository; as specified by the popularity information, communicate with a server resource to retrieve a copy of the content; store the retrieved copy of the content in the first supplemental repository for distribution to subscribers; and in accordance with an access order of distributing the content to the subscribers, providing access to the copy of content from the first supplemental repository.

Another embodiment includes a computer readable storage medium and/or system having instructions stored thereon to facilitate remote control of a remote media system. The instructions, when executed by computer processor hardware, cause the computer processor hardware (such as one or more processor devices) to: store first content in a first repository for distribution; store second content in a second repository for distribution, the second repository being a backup distribution resource with respect to the first repository; store third content in a third repository, the third repository being a backup distribution resource with respect to the second repository; and selectively populate the second repository with the second content, the second content including selected portions of the third content stored in the third repository.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the distributing content from a multi-tier content distribution system. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
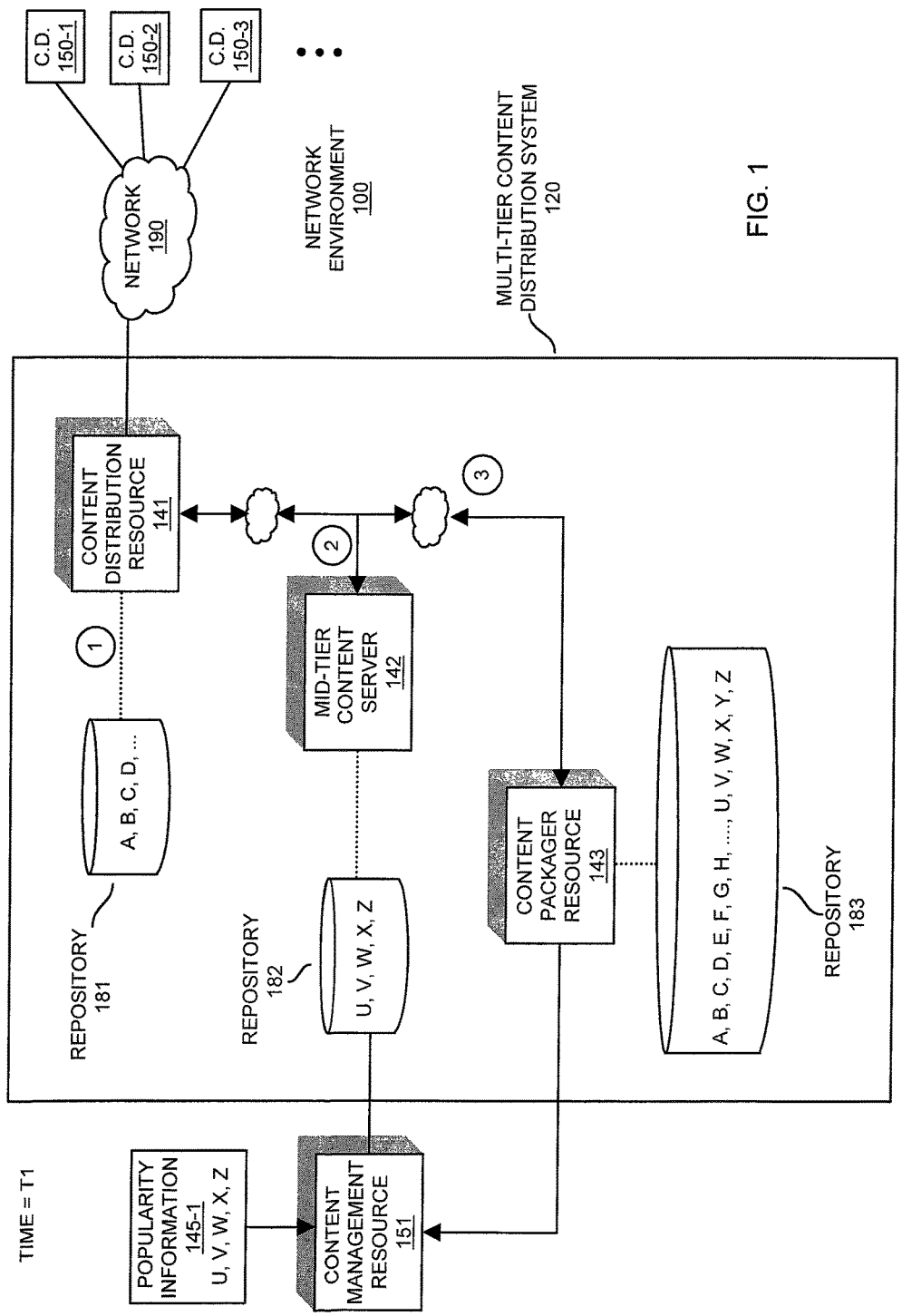
FIG. 1 is an example diagram illustrating a multi-tier content distribution system and storage of content in multiple respective repositories according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example diagram illustrating a functional block diagram of hardware/software resources associated with a multi-tier content distribution system according to embodiments herein.

As shown, multi-tier content distribution system 120 resides in network environment 100 and facilitates distribution of content (such as video, images, audio, information, data, etc.) over network 190 to one or more communication devices 150.

Communication devices 150 (such as client devices) include communication device 150-1, communication device 150-2, communication device 150-3, etc. Each of the communication devices 150 (including respective hardware, software, firmware, etc.) is operable to communicate over network 190 to retrieve content from multi-tier content distribution system 100.

Note that network 190 can include any suitable hardware and software resources facilitating communications between the communication session 150 and the multi-tier content distribution system 120. For example, network 190 can include any combination of one or more fiber optic cables, coaxial cable, wireless communication links, Internet connections, etc., to provide connectivity between the communication devices 150 and the multi-tier content distribution system 120.

In this example embodiment, multi-tier content distribution system 120 includes a first repository 181, a second repository 182, and a third repository 183 from which to distribute content to communication devices 150. Each of the repositories can be co-located or disparately located with respect to each other.

Note that inclusion of three repositories (a first repository 181, second repository 182, and a third repository 183) is shown by way of non-limiting example only; the multi-tier content distribution system can include any number of repositories.

As shown in this example embodiment, each of the repositories stores different content available for retrieval by the respective users of communication devices 150.

For example, repository 181 stores content A, content B, and content C, and content D, etc.

Repository 182 stores content U, content V, content W, content X, and content Z.

Repository 183 stores all or a large amount of available content such as content A, B, C, D, E, F, G, H, . . . , U, V, W, X, Y, and Z, In one embodiment, the third repository 183 stores many or all available titles of content available from a cable network service provider for distribution via video on demand services. The users of the communication devices 150 can be notified of available content from the multi-tier content distribution system 120 via a respective content guide.

Note that the content stored in repository 183 may require formatting in order to distribute to respective users operating communication devices. By way of non-limiting example, the third repository 183 can be configured to store a copy of content stored in the first repository 181 and a copy of the content stored in the second repository 182. However, as previously discussed, the multi-tier content distribution system 120 attempts retrieval of the content from the first repository 181 and then the second repository 182 prior to falling back on distribution of requested content from the third repository 183. Accordingly, the content packager resource 143 may be a last resort from which to distribute content.

Multi-tier content distribution system 120 further includes content distribution resource 141, mid-tier content server 142, and content packager resource 143. Such resources provide access to the different repositories. For example, content distribution resource 141 provides access to repository 181 and corresponding content. Mid-tier content server 142 provides access to repository 182 and corresponding content. Content packager resource 143 provides access to corresponding content stored in repository 183.

Note that the distribution of content as previously discussed is shown by way of non-limiting example only. In yet further embodiments, content distribution resource 141 is operable to directly access repository 182 (as opposed to forwarding a respective request for content to mid-tier content server 142) in order to retrieve and distribute content to corresponding client devices 150. As previously discussed, the repository 182 may be co-located with repository 181.

In accordance with further embodiments, during operation, the first repository 181 serves as a first choice from which to distribute requested content to a requesting party. For example, on behalf of a respective user operating communication device 150-1, assume that the communication device 150-1 forwards a request over network 190 for retrieval of content G from the multi-tier content distribution system 120.

In this instance, the content distribution resource 141 first determines if the requested content G is stored in repository 181. Because content G is not stored in repository 181, the content distribution resource 141 attempts retrieval and distribution of the requested content G from the second repository 182, which serves as a second choice from which to distribute the requested content G. Thus, the second repository 182 serves as a backup resource with respect to the first repository 181.

Assume further in this example that content G is not stored in the repository 182. In such an instance, the mid-tier content server 141 checks one or more supplemental repositories in addition to supplemental repository 182 for the requested content G. After exhausting the storage possibilities, and detecting that the requested content G is not available from any repositories managed and/or accessible by the mid-tier content server 142, the mid-tier content server 142 attempts retrieval and distribution of the requested content from the third repository 183, which serves as a backup resource to the second repository 182.

More specifically, the content packager resource 143 that serves as the last resort does have access to the requested content G as stored in repository 183 in this instance. To service the request for content G, as its name suggests, the content packager resource 143 processes the content G stored in repository 183 into a suitable format for distribution from content distribution resource 141 over network 190 to the requesting user operating communication device 150-1.

In one embodiment, packaging of the content G (by content packager resource 143) includes segmenting the content into different retrievable portions (such as into one or more data packets, portions, etc.) as well as producing content access information indicating the different retrievable segments associated with content G. The multi-tier content distribution system 120 (such as from content distribution resource 141) forwards the content access information associated with segmented content G to communication device 150-1 in response to receiving the request for content G.

Communication device 150-1 receives the content access information (manifest file) and then uses the content access information (specifying an order of retrieving and playing back segments of retrievable content) to communicate with content distribution resource 141 to retrieve the segment of content G. The content distribution resource 141 can be configured to distribute the requested segments of content G produced by content packager resource 143 over network 190 to the communication device 150-1.

In one embodiment, the content access information associated with content G indicates to retrieve a first segment of the content G, followed by retrieval of a second segment of the content G, followed by a third segment of the content G, etc.

In such an instance, the communication device 150-1 initially transmits a request for the first segment of content G2 content distribution resource 141. The content distribution resource 141 forwards the first requested segment of content G2 to the communication device 150-1. The communication device 150-1 plays back the first segment of content for viewing by the respective user of the communication device. Further, in accordance with the content access information associated with content G, the communication device 150-1 then requests retrieval of a second segment of content G from the content distribution resource 141. The content distribution resource 141 forwards the requested second segment of content G2 to the communication device 150-1. The communication device 151 plays back the second segment of content G for viewing by the respective user of the communication device, and so on. In this manner, the communication device 150-1 uses the manifest file (Information) to retrieve segments of content for sequential playback to a respective user operating communication device.

In a manner, any of one or more client devices can be configured to communicate over network with the multi-tier content distribution system 120 to retrieve stored content.

In accordance with further embodiments, the content stored and distributed from repository 181 and repository 182 is pre-processed into segmented portions and corresponding content access information prior to receiving corresponding request for such content.

More specifically, the content stored in the first repository 181 and the second repository 182 can include pre-formatted content for immediate distribution to requesting client devices. In other words, the content stored in the first repository 181 and the second repository 182 is already segmented and includes a respective manifest file in which to retrieve the respective segments of content.

Distribution of the content from the third repository 183 (from the content packager resource 143), as previously discussed, may be less desirable than distribution from the first repository 181 and the second repository 182 because the content in the third repository 183 requires processing after receiving a request (because the repository 183 is not a transactional data store as are repository 181 and repository 182, and because content packager resource 143 provides content at a lower performance level) before such content is available for retrieval by the communication devices. Thus, delivery of respective content from the third repository 183 is susceptible to being delayed in comparison to delivery of content from the first repository 181 or the second repository 182.

This disclosure includes the observation that repeated distribution of the same requested popular content from the content packager resource 143 (if needed because the requested content is not stored in repository 181 or repository 182) may be undesirable because distribution of the same requested content may require repackaging for every request instance, resulting in duplicated processing. There is also an inherent delay of transporting the requested content over the network from content packager resource 143 to content distribution resource 141. To provide more efficient delivery of content to the communication devices 150 from the multiple repositories associated with multi-tier content distribution system 120, the multi-tier content distribution system 120 can be configured to include a content management resource 151 operable to selectively populate the second repository 182 with popular, pre-formatted content (or content expected to be popular based on prior history), commonly retrieved from the third repository 183.

More specifically, the multi-tier content distribution system 120 or other suitable resource produces performance information 145-1 (or content consumption information) indicating titles of content that are expected to be popular or content that is known to be currently popularly retrieved from the content packager resource 143 and the third repository. In accordance with further embodiments, the multi-tier content distribution system 120 or other suitable resource can produce performance information 145-1 (or content consumption information) indicating titles of content that are expected to be popular or content that is known to be currently popular and distributed from content packager resource 143 and corresponding repository 183. Additionally, the multi-tier content distribution system 120 or other suitable resource can produce performance information 145-1 (or content consumption information) indicating titles of content that are expected to be popular or content that is known to be currently popular and distributed from content distribution resource 141 and/or mid-tier content server 142.

In accordance with constantly updated content consumption information (popularity information 145) indicating trending and most popular content, the content management resource 151 initiates updating of the second repository 182 to include specified titles of content available from the third repository 183.

Thus, in one embodiment, depending on a trend of users (and corresponding communication devices 150) retrieving portions of content stored in the third repository 183, the content management resource 151 initiates storage of a copy of the popularly retrieved content from the third repository 183 to the second repository 182 or repository 181 if suitable.

As a more detailed discussion of embodiments, the content management resource 151 derives and stores content in the second repository 182 based on content stored in the third repository 183. Based on such operations of updating the content in the second repository 182, instead of having to retrieve the more popular content from the third repository 183, the multi-tier content distribution system 120 (on behalf of client devices 150) is able to retrieve and distribute the popular content from the second repository 182.

For example, in such an embodiment, the content management resource 151 receives popularity information 145-1 at time T1 indicating that popular retrieved content from the content packager resource 143 includes content U, content V, content W, content X, and content Z. The content management resource 151 communicates with content packager resource 143 to store such content in repository 182 or repository 181 if suitable.

As previously discussed, the content packager resource 143 pre-formats the portions of content U, V, W, X and Z and produces respective content access information prior to storage in the second repository 182. Storing of the pre-formatted content in the second repository 182 (and/or first repository 181 if desired) as well as generation and storage of respective content access information (such as manifest file for each title of content) in repository 182 supports immediate on-demand distribution to retrieving client devices. In contrast, as previously discussed, in one embodiment, servicing of a respective request from the third repository 183 by the content packager resource 143 requires formatting prior to distribution of such content to a respective requested.

Assume that the communication device 150-2 requests retrieval of content W. In a manner as previously discussed, the content distribution resource 141 learns that requested content W is not stored in repository 181 and then forwards the request to the mid-tier content server 142 which is able to immediately retrieve preprocessed content W and corresponding content access information and forward it to the content distribution resource 141 for further distribution to the communication device 150-2. The communication device 150-2 uses the received content access information generated for content W to retrieve the different segments of content associated with content W stored in repository 182.

Accordingly, storage of popular content in repository 182 or repository 181 eliminates delays because the popular content is already formatted (such as in multiple segments) for distribution.

Figure 2:
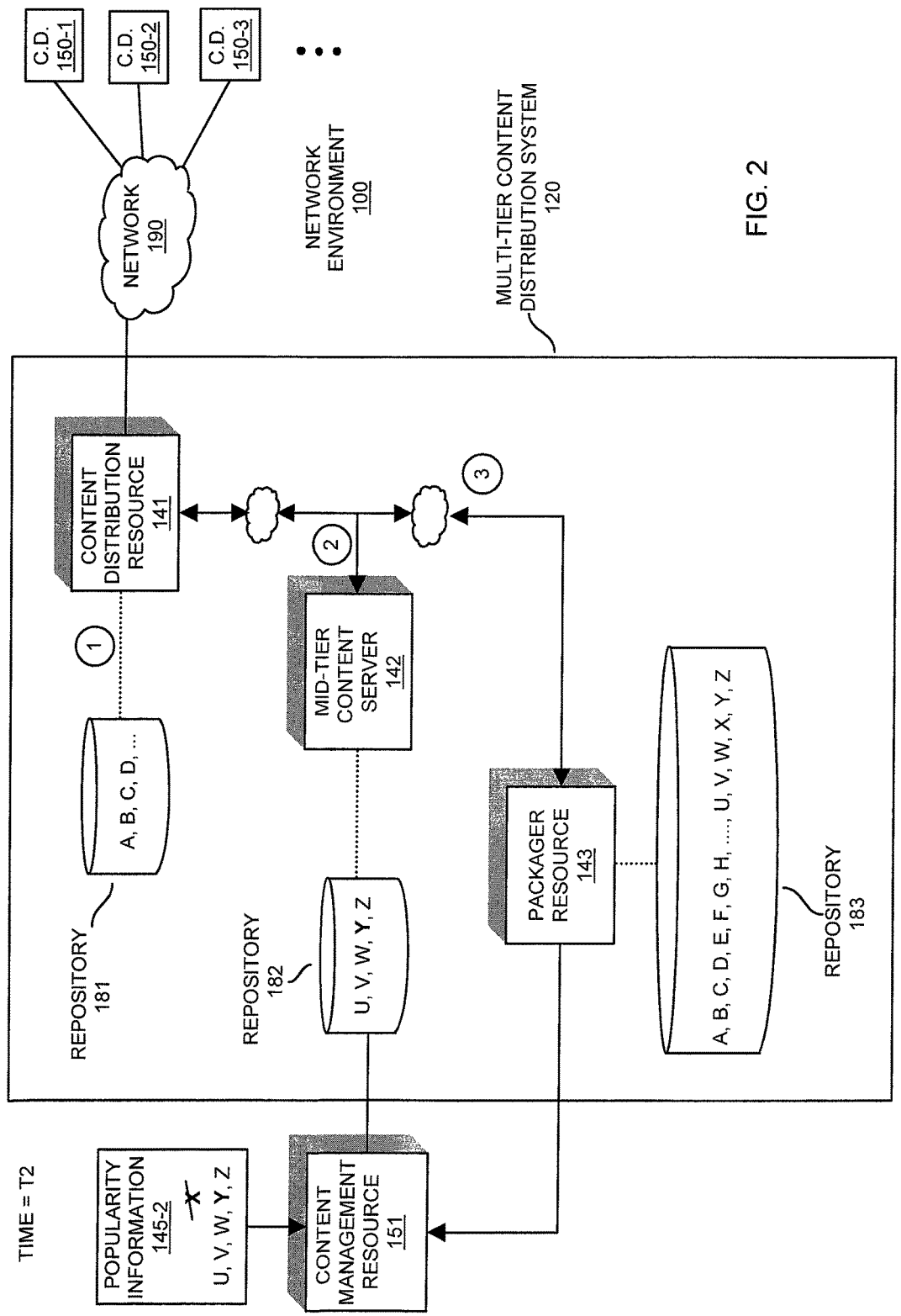
FIG. 2 is an example diagram illustrating updating of content in a tier of the multi-tier content distribution system based on popularity information according to embodiments herein.

FIG. 2 is an example diagram illustrating updating storage of content according to embodiments herein.

As previously discussed, over time, the most popular content consumed by respective client devices (communication device 150) may change as indicated by popularity information 145-2 generated at time T2.

In this instance, the popularity information 145-2 indicates that content Y is now popular or is expected to be popular amongst viewers. To accommodate the change in content consumption demands as indicated by the popularity information 145-2, the content management resource 151 updates the content stored in the second repository 182 to reflect the new demand for content.

For example, assume that a first title of content X stored in the second repository 182 at or around time T1 eventually becomes less popular than a second title of content Y (such as around time T2) as specified by the popularity information 145-2. In such an instance, the content management resource 115 initiates replacement of the first title of content X in the second repository 182 with the more popular second title of content Y, increasing efficiency of delivering content from the multi-tier content distribution system 120.

In this manner, over time, the content management resource 151 constantly updates the content stored in repository 182, reducing instances in which the content packager resource 143 must be accessed to process and distribute requested content not available for retrieval from repository 181 and repository 182.

Figure 3:
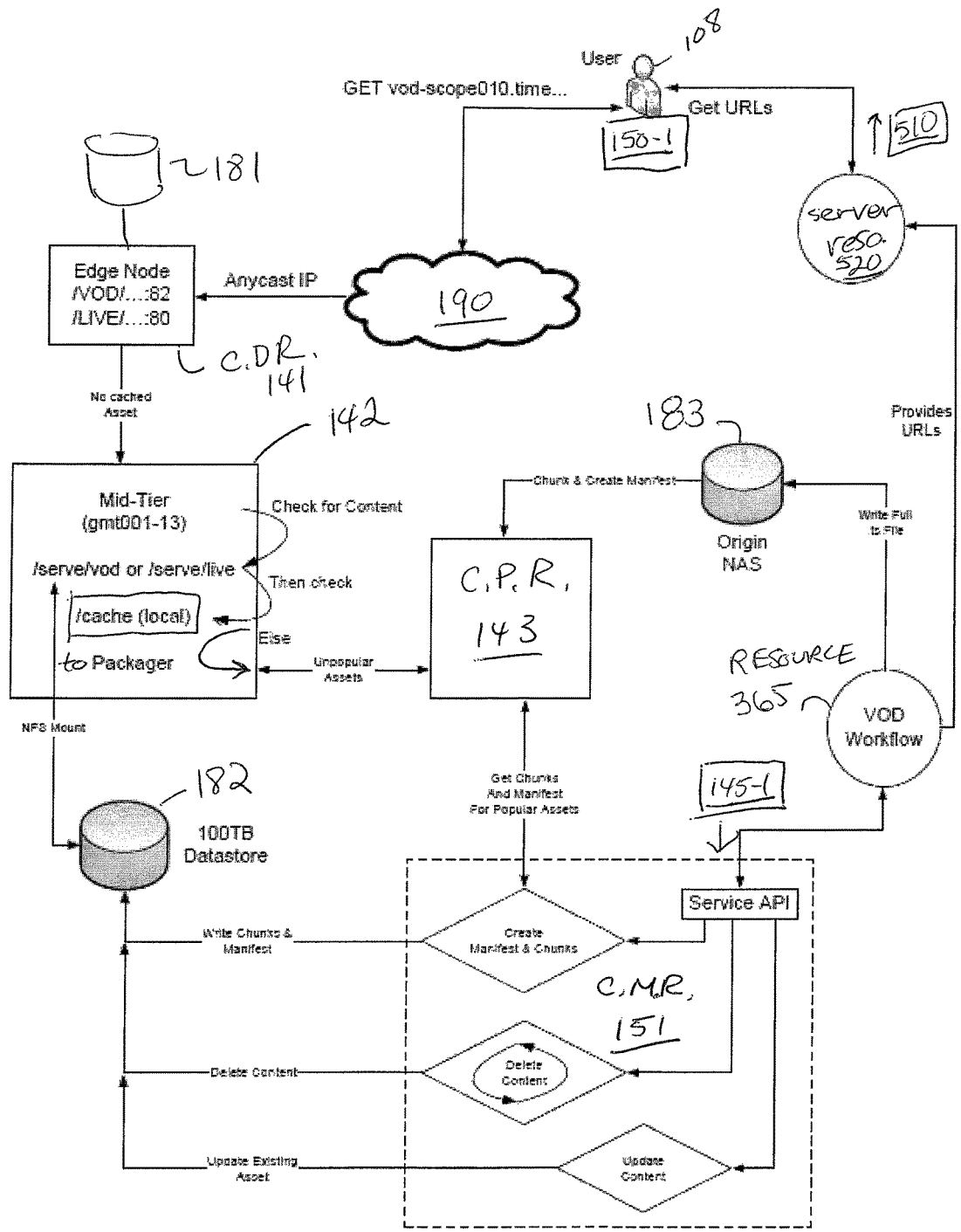
FIG. 3 is a more specific example diagram illustrating a functional block diagram of a multi-tier content distribution system and distribution of content according to embodiments herein.

FIG. 3 is a more specific example diagram illustrating a functional block diagram of a multi-tier content distribution system and distribute of content according to embodiments herein.

As shown, the user 108 operates communication device 150-1 to retrieve the content guide 510 (content guide information, listing of titles of available content, etc.) from server resource 520. In one embodiment, resource 365 produces the content guide 510 to include appropriate URLs (Uniform Resource Locators, network addresses, etc.) from which to retrieve different content from the multi-tier content distribution system 120.

In response to receiving input for selection of a particular title of content from the content guide 510 using the appropriate URL assigned to the requested content, the communication device 150-1 forwards the request for content over network 190 to the content distribution resource 141. As previously discussed, if the content is available from repository 181 the content distribution resource 141 forwards the appropriate content over network 190 to the communication device 150-1 for playback to the user 108.

If not, the content distribution resource 141 forwards the request for content to the mid-tier content server 142. The mid-server 142 checks whether the requested content is stored in repository 182. If not, the mid-tier content server 142 checks whether the requested content is stored in its local cache. If not, the mid-tier content server 142 forwards the respective requests for content to the content packager resource 143 (video on demand packager). The content packager resource 143 obtains the appropriate segments of content and corresponding manifest from repository 183 and forwards it to the respective communication device 150-1 in a manner as previously discussed.

Further, as previously discussed, the multi-tier content distribution system 120 includes content management resource 151. As shown in FIG. 3, the content management resource 151 receives popularity information 145-1 or other suitable information from the resource 365 (video-on-demand workflow processor). The content management resource 151 uses the popularity information 145-1 to manage which content is stored in repository 181 and/or repository 182.

In this example embodiment, the content management resource 151 identifies content available from the content packager resource 143 that is to be segmented and stored in repository 182. In addition to storing segmented portions of the identified content, the content management resource 151 initiates generation and storage of a respective manifest file for each title of content stored in repository 182.

As previously discussed, the content management resource 151 deletes and updates the content stored in repository 182 based upon identification of new content that is expected to be popular or that is identified already known as being popular.

Figure 4:
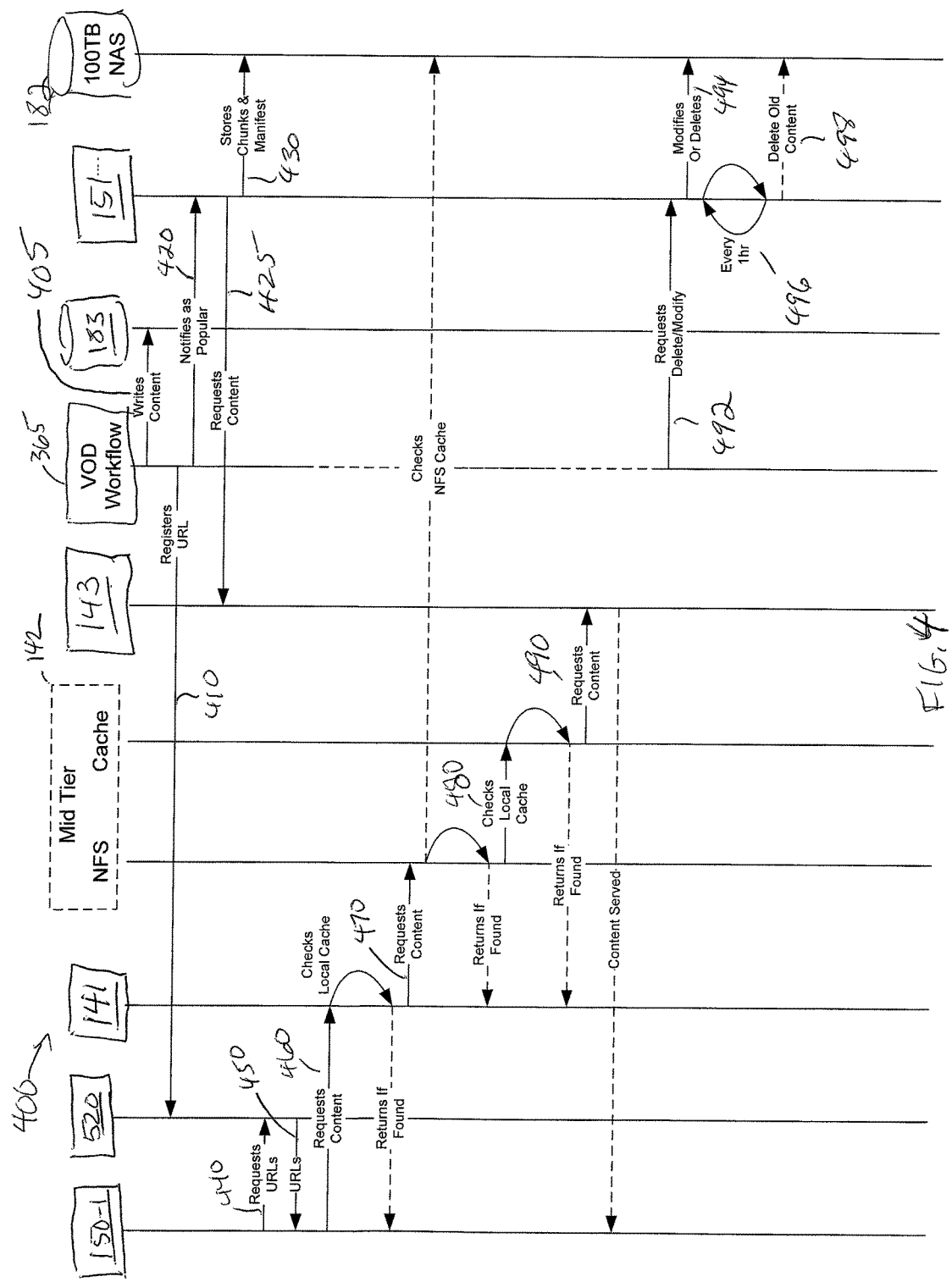
FIG. 4 is an example timing diagram illustrating operations of retrieving content from the multi-tier content distribution system and distribution to multiple requesting communication devices according to embodiments herein.

FIG. 4 is an example timing diagram illustrating operations of retrieving content from the multi-tier content distribution system and distribute to multiple requesting communication devices according to embodiments herein.

As shown in timing diagram 400, via communications 405, the resource 365 (video-on demand workflow) writes content that is to be available as video-on-demand to repository 183.

Via communications 410, the resource 365 (video-on-demand workflow) registers URLs (or other suitable pointers) with the server resource 520.

Via communications 420, the resource 365 notifies content management resource 151 of popular content via popularity information 145.

Via communications 425, the content management resource 151 requests the identified popular content from content packager resource 143.

Via communications 430, the content manager resource 151 initiates storage of the segments of content and corresponding manifest file for each identified popular title of content to be stored in repository 182.

Via communications 440, the user 108 operating communication device 150-1 requests retrieval of a content guide indicating availability of the different titles of content.

Via communications 450, the server resource 520 forwards content guide information to the communication device 150-1. In one embodiment, the content guide information indicates a network address from which to retrieve different titles of content.

Via communications 460, the communication device 150-1 forwards a respective request for content to the content distribution resource 141. If the requested content is locally available such as in a respective cache or repository 181, the content distribution resource 141 serves the content to the communication device 150-1.

If the content is not locally available such as from repository 181, the content distribution resource 141 transmits communications 470 to the mid-tier content server 142 requesting the retrieval of content. The mid-tier content server 142 checks a respective network file system (the information in the repository 182 can be NFS mounted so that it appears local to mid-tier content server 141) to determine whether the requested content is available from repository 182. If so, the mid-tier content server 142 retrieves the content from repository 182 and serves it to the communication device 150-1 over network 190.

Alternatively, if the content is not available from the repository 182, the mid-tier content server 142 checks its local cache via communications 480 4 the requested content. If the requested content is available from its local cache, the mid-tier content server 142 serves the requested content from the local cache to communication device 150-1.

However, if the local cache does not store the requested content, the mid-tier content server 142 generates communications 490 to retrieve the requested content from the content packager resource 143. In such an instance, the content packager resource 143 provides appropriate segments of content corresponding content access information for delivery to the communication device 150-1 in a manner as previously discussed.

As a background operation, also as previously discussed, the content management resource 151 constantly updates the content stored in repository 182 to provide more efficient delivery of content to multiple communication devices 150.

For example, via communications 492, the resource 365 notifies content management resource 151 of the popular titles of content in which to store in the repository 182.

In accordance with the popularity information 145, via further communications 494, the content management resource 151 modifies and/or deletes the content stored in repository 182. In one embodiment, as shown by update process 496, the content management resource 151 is notified of newly popular content.

Via communications 498, the content manager resource 151 initiates deletion of old content in repository 182 4 storage in favor of newly popular content.

Figure 5:
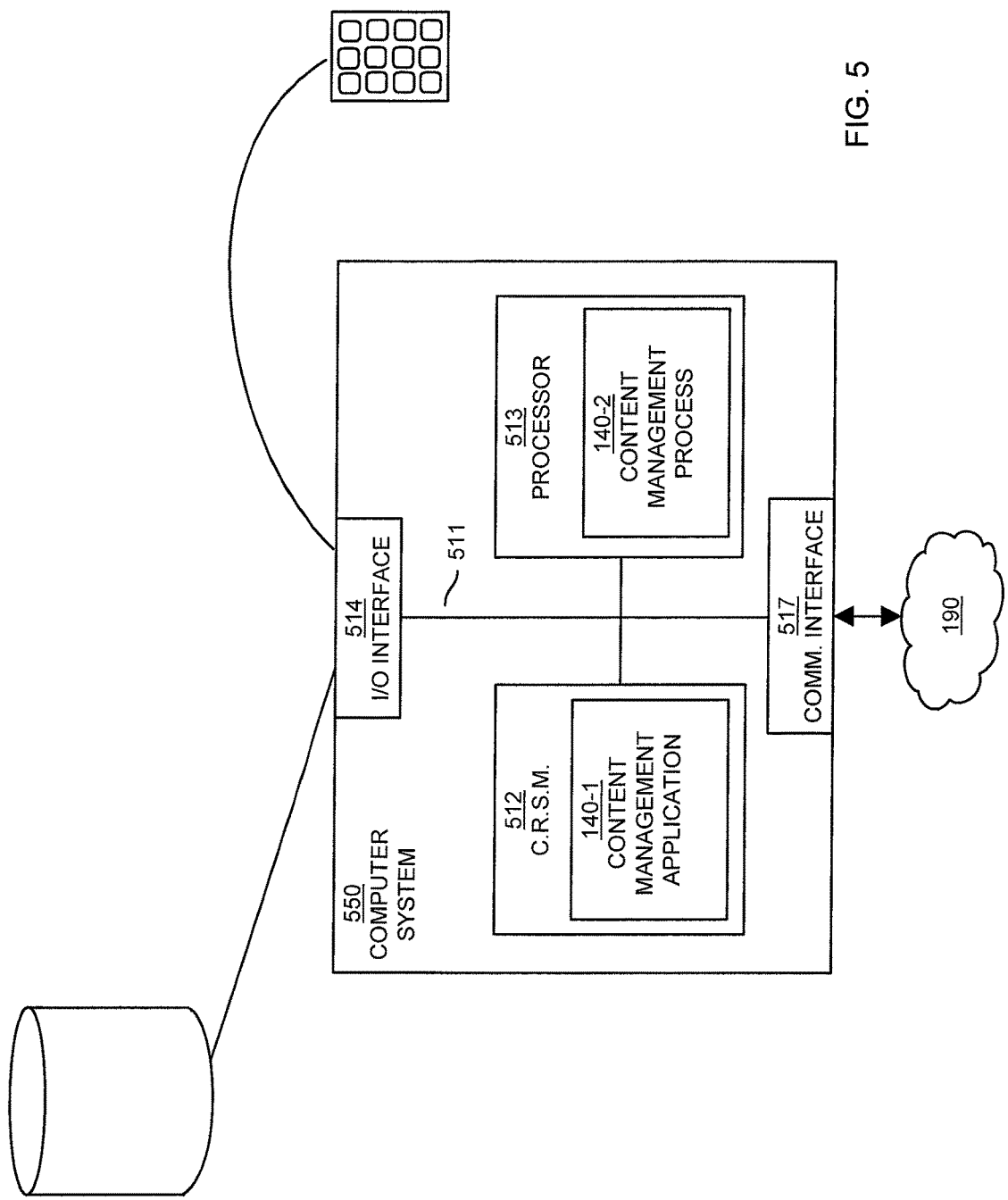
FIG. 5 is a diagram illustrating an example computer architecture to execute operations according to embodiments herein.

FIG. 5 is an example block diagram of a computer system for implementing any of the operations as discussed herein according to embodiments herein.

Any of the resources (e.g., communication devices 150, content distribution resource 141, mid-tier content server 142, content packager resource 143, content management resource 151, etc.) can be configured to include a processor and executable instructions to carry out the different operations as discussed herein.

As shown, computer system 550 of the present example can include an interconnect 511 that couples computer readable storage media 512 such as a non-transitory type of media (i.e., any type of hardware storage medium) in which digital information can be stored and retrieved, a processor 513, I/O interface 514, and a communications interface 517. I/O interface 514 supports connectivity to one or more repositories.

Computer readable storage medium 512 can be any hardware storage device such as memory, optical storage, hard drive, floppy disk, etc. In one embodiment, the computer readable storage medium 512 stores instructions and/or data.

As shown, computer readable storage media 512 can be encoded with content management application 140-1 (e.g., including instructions) to carry out any of the operations as discussed herein.

During operation of one embodiment, processor 513 accesses computer readable storage media 512 via the use of interconnect 511 in order to launch, run, execute, interpret or otherwise perform the instructions in content management application 140-1 stored on computer readable storage medium 512. Execution of the content management application 140-1 produces content management process 140-2 to carry out any of the operations and/or processes as discussed herein.

Those skilled in the art will understand that the computer system 550 can include other processes and/or software and hardware components, such as an operating system that controls allocation and use of hardware resources to content management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 650 may reside at any location or can be included in any suitable resource in any network environment to implement functionality as discussed herein.

Functionality supported by the different resources will now be discussed via flowcharts in FIGS. 6-8. Note that the steps in the flowcharts below can be executed in any suitable order.

Figure 6:
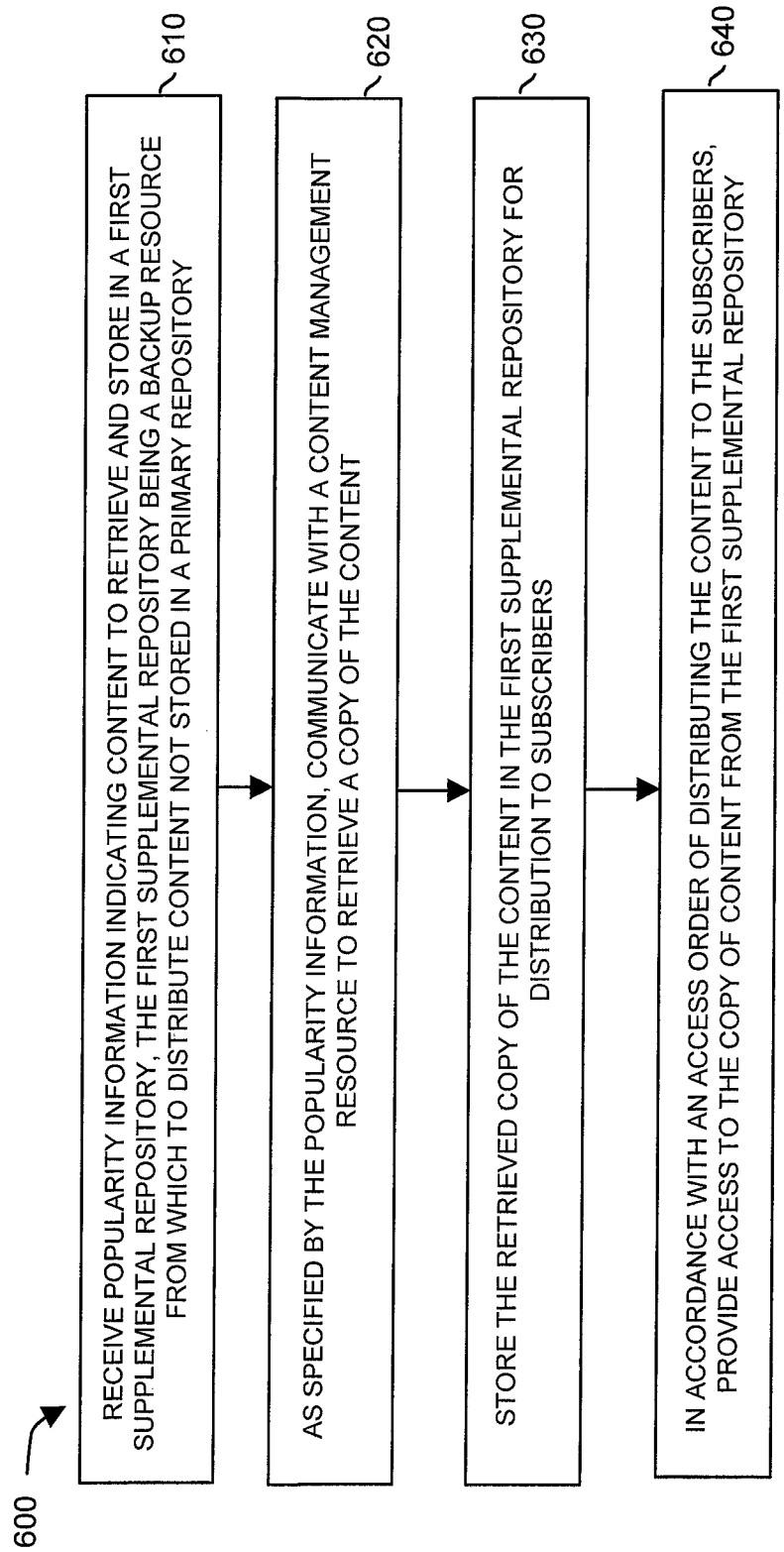
FIGS. 6-8 are example diagrams illustrating methods of distributing content from a multi-tier content distribution system according to embodiments herein.

FIG. 6 is a flowchart 600 illustrating an example method according to embodiments herein. Note that there will be some overlap with respect to concepts as discussed above.

In processing operation 610, the content management resource 151 receives popularity information 145-2 indicating content to retrieve and store in repository 182 (such as a first supplemental repository with respect to the repository 181). The repository 182 is a backup resource from which to retrieve and distribute content not stored in repository 181 (a primary repository of multi-tier content distribution system 120).

In processing operation 620, as specified by the popularity information 145-1, the content management resource 151 communicates with content packager resource 143 (another content management resource in multi-tier content distribution system 120) to retrieve a copy of the content Y.

In processing operation 630, the content management resource 151 stores the retrieved copy of the content Y in the repository 182 (first supplemental repository) for subsequent distribution to user subscribers operating respective communication devices 150.

In processing operation 640, in accordance with an access order of distributing the content to the communication devices and corresponding subscribers, the multi-tier content distribution system 120 provides access to the copy of content Y from the repository 182 (first supplemental repository with respect to repository 182).

Figure 7:
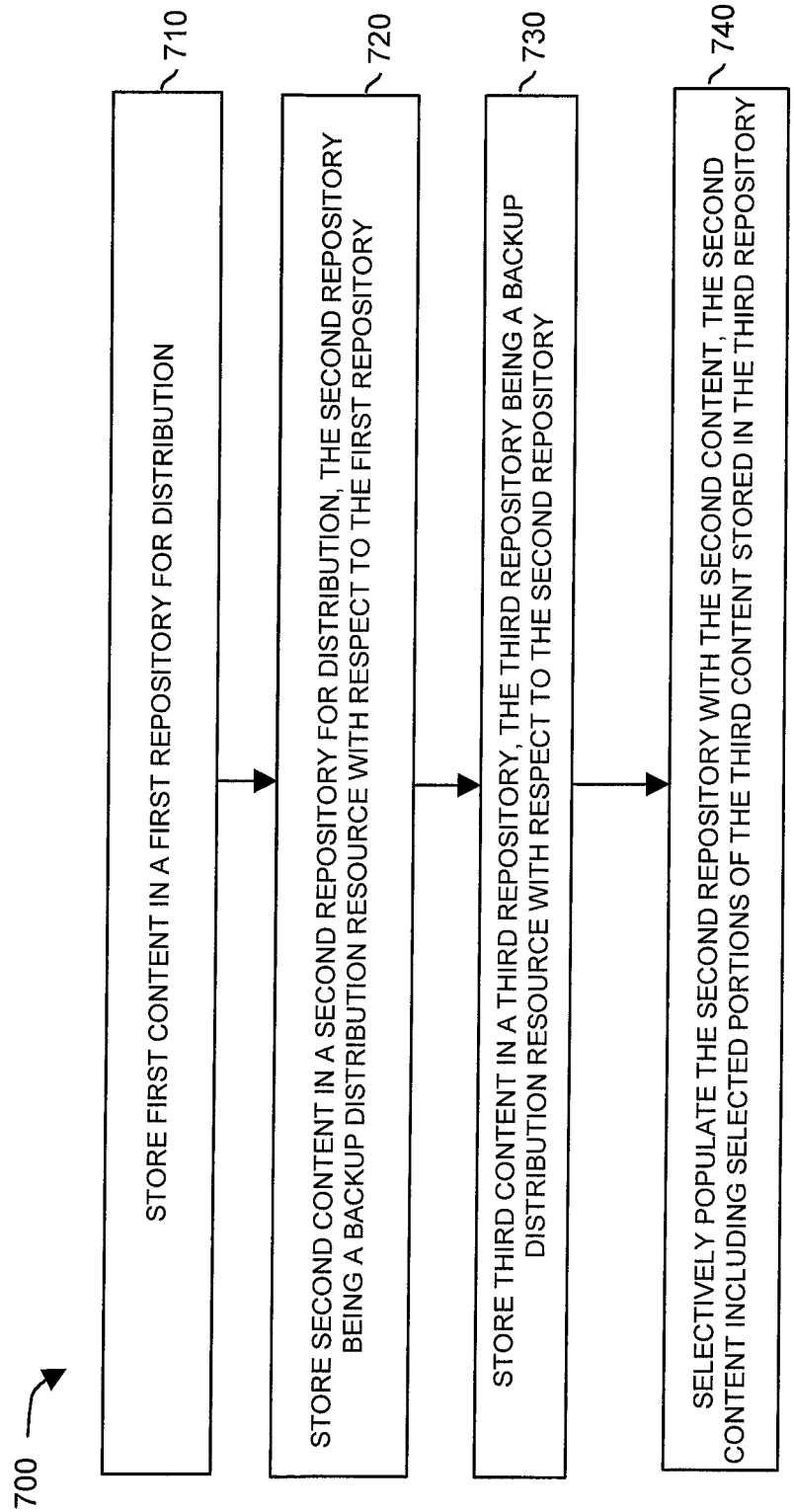

FIG. 7 is a flowchart 700 illustrating an example method according to embodiments herein. Note that there will be some overlap with respect to concepts as discussed above.

In processing operation 710, the multi-tier content distribution system 120 stores first content such as content A, B, C, D, . . . in a first repository 181 for distribution.

In processing operation 720, multi-tier content distribution system 120 stores second content such as content U, V, W, X, etc., in a second repository 182 for distribution. The second repository 182 is a backup storage and distribution resource with respect to the first repository 182.

In processing operation 730, the multi-tier content distribution system 120 stores third content in a third repository 183. The third repository 183 is a backup distribution resource with respect to the second repository 182.

In processing operation 740, the multi-tier content distribution system 120 (and more specifically the content management resource 151) selectively populates the second repository 182 with updated content. In one embodiment, as previously discussed, content stored in the second repository 182 includes selected portions of the content stored in the third repository 183.

Figure 8:
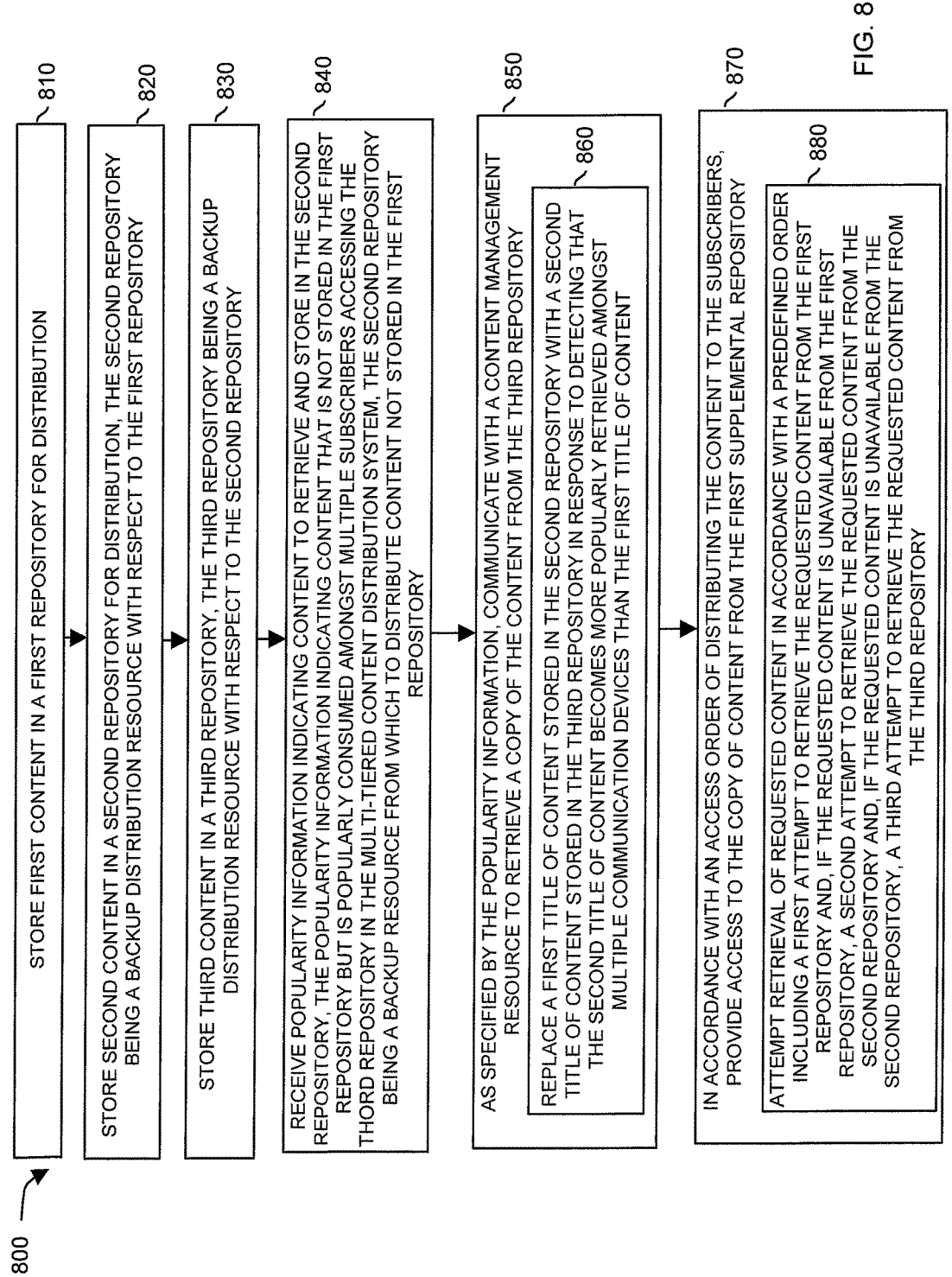

FIG. 8 is a flowchart 800 illustrating an example method according to embodiments herein. Note that there will be some overlap with respect to concepts as discussed above.

In processing operation 810, the multi-tier content distribution system 120 stores first content such as content A, B, C, D, . . . in a first repository 181 for distribution.

In processing operation 820, multi-tier content distribution system 120 stores second content such as content U, V, W, X, etc., in a second repository 182 for distribution. The second repository 182 is a backup storage and distribution resource with respect to the first repository 182.

In processing operation 830, the multi-tier content distribution system 120 stores third content in a third repository 183. The third repository 183 is a backup distribution resource with respect to the second repository 182.

In processing operation 840, the content management resource 151 receives popularity information 145-2 indicating content (such as title of content Y) to retrieve and store in the second repository 182. The popularity information 145-2 indicates content that is currently not stored in the first repository 181 but is popularly consumed or is expected to be popularly consumed amongst multiple subscribers (uses of respective communication devices 150) accessing the third repository 183 in the multi-tiered content distribution system 120. The second repository 182 is a backup resource from which to distribute content not stored in the first repository 181.

In processing operation 850, as specified by the popularity information 145-2, the content management resource 151 communicates with the content packager resource 143 (another content management resource) to retrieve a copy of the content Y from the third repository 183.

In sub-processing operation 860 associated with processing operation 850, the content management resource 151 replaces first title of content ask stored in the repository 182 with an updated title of content Y obtained from the third repository 183 in response to detecting that the second title of content 182 becomes more popularly retrieved amongst multiple communication devices 150 than the first title of content X.

In processing operation 870, in accordance with an access order of distributing the content to the subscribers (i.e., users operating communication devices 150), the multi-tier content distribution system 120 provides access to the copy of content Y from the first supplemental repository (i.e., repository 182).

In processing operation 880 associated with processing operation 870, the multi-tier content distribution system 120 attempts retrieval of requested content Y in accordance with a predefined order including a first attempt to retrieve the requested content Y from the first repository 181 and, since the requested content Y is unavailable from the first repository 181, the multi-tier content distribution system 120 attempts to retrieve the requested content from the second repository 182. Since the requested content Y is available from the repository 182, the multi-tier content distribution system 120 initiates distribution of the requested content Y from the repository 182.

As previously discussed, note again that if the requested content is unavailable from both the first repository 181 and the second repository 182, the multi-tier content distribution system 120 makes an additional attempt to retrieve the requested content from the third repository 183.

In this manner, any number of repositories can be accessed to retrieve and distribute content to a requesting client.

Note again that techniques herein are well suited to facilitate efficient distribution of content from a multi-tier content distribution system to multiple client devices in the network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A multi-tier content distribution system comprising:
a first repository from which to distribute first content;
a second repository from which to retrieve and distribute second content, the second repository storing the second content and being an alternative storage resource with respect to the first repository from which to distribute content not available in the first repository, the second content different than the first content;
a third repository from which to distribute third content, the third repository being an alternative storage resource with respect to the second repository from which to retrieve and distribute respective content that is unavailable from the second repository; and
content management hardware to selectively populate the second repository with the second content, the second content including a portion of the third content stored in the third repository;
the multi-tier content distribution system further comprising:
first computer processor hardware, the first computer processor hardware providing access to the first content stored in the first repository, the first computer processor hardware operable to receive a request for content from a communication device;
second computer processor hardware, the second computer processor hardware providing access to the second content stored in the second repository, the second computer processor hardware operable to receive the request from the first computer processor hardware in response to the first computer processor hardware detecting that the requested content is not available from the first repository; and
third computer processor hardware, the third computer processor hardware providing access to the third content stored in the third repository, the third computer processor hardware operable to receive the request from the second computer processor hardware in response to the second computer processor hardware detecting that the requested content is not available from the second repository.

2. The multi-tier content distribution system as in claim 1, wherein the portion of the third content stored in the second repository is identified by the content management hardware as popular content available for distribution from the third repository to multiple communication devices accessing the multi-tier content distribution system.

3. The multi-tier content distribution system as in claim 1, wherein the third repository stores a copy of the first content stored in the first repository and a copy of the second content stored in the second repository.

4. The multi-tier content distribution system as in claim 1, wherein the content management hardware produces the second content to include multiple retrievable segments; and
wherein the content management hardware produces content access information indicating an order in which to sequentially retrieve the multiple retrievable segments.

5. The multi-tier content distribution system as in claim 1, wherein the content management hardware is operable to update the second content stored in the second repository using the third content stored in the third repository depending on a trend of users retrieving portions of the third content stored in the third repository.

6. The multi-tier content distribution system as in claim 1, wherein the first content in the first repository and the second content in the second repository are pre-formatted for on-demand distribution; and
wherein the third content requires formatting prior to distribution.

7. The multi-tier content distribution system as in claim 1 further comprising:

an access control resource operable to attempt retrieval of requested content in accordance with a predefined order in which the access control resource: first attempts to retrieve the requested content from the first repository and, if the requested content is unavailable from the first repository, second attempts to retrieve the requested content from the second repository and, if the requested content is unavailable from the second repository, third attempts to retrieve the requested content from the third repository.

8. The multi-tier content distribution system as in claim 1, wherein the content management hardware is operable to replace a first title of content stored in the second repository with a second title of content stored in the third repository in response to detecting that the second title of content becomes more popularly retrieved than the first title of content.

9. In a multi-tier content distribution system operable to distribute content to communication devices in a network, a method comprising:

via computer processor hardware, performing operations of:
receiving popularity information indicating content to retrieve and store in a first supplemental repository, the first supplemental repository being a storage resource from which to distribute content not stored in a primary repository;
as specified by the popularity information, communicating with a content management resource to retrieve a copy of the content;
storing the retrieved copy of the content in the first supplemental repository for distribution to subscribers; and
in accordance with an access order of distributing the content to the subscribers, providing access to the copy of the content from the first supplemental repository in response to detecting that the content is unavailable for distribution from the primary repository; and
wherein the popularity information indicates that the content is popularly delivered from the content management resource in the multi-tier content distribution system, the content management resource having access to a second supplemental storage resource from which to distribute content not available from the primary repository and the first supplemental repository.

10. The method as in claim 9, wherein the access order indicates to first attempt delivery of the content from the primary repository and, after a determination that the content is not available from the primary repository, second attempt delivery from the first supplemental repository.

11. The method as in claim 10, wherein the access order indicates to attempt delivery from the second supplemental storage resource after a determination that the content is not available from the first supplemental repository.

12. In a multi-tier content distribution system operable to distribute content to communication devices in a network, a method comprising:

via computer processor hardware, performing operations of:
receiving popularity information indicating content to retrieve and store in a first supplemental repository, the first supplemental repository being a storage resource from which to distribute content not stored in a primary repository;
as specified by the popularity information, communicating with a content management resource to retrieve a copy of the content;
storing the retrieved copy of the content in the first supplemental repository for distribution to subscribers; and
in accordance with an access order of distributing the content to the subscribers, providing access to the copy of the content from the first supplemental repository in response to detecting that the content is unavailable for distribution from the primary repository; and
wherein a second supplemental repository is one of multiple repositories from which to attempt distribution of the content if the content is not available for distribution from the primary repository and the first supplemental repository.

13. A method comprising:
storing first content in a first repository for distribution;
storing second content in a second repository for distribution, the second repository being a supplemental distribution resource with respect to the first repository, the second content different than the first content;
storing third content in a third repository, the third repository being a supplemental distribution resource with respect to the second repository; and
selectively populating the second repository with the second content, the second content including selected portions of the third content stored in the third repository;
the method further comprising:
pre-formatting the first content stored in the first repository and the second content stored in the first supplemental repository for on-demand distribution; and
wherein the third content requires formatting prior to distribution;
the method further comprising: attempting retrieval of requested content in accordance with a predefined order including a first attempt to retrieve the requested content from the first repository and, if the requested content is unavailable from the first repository, a second attempt to retrieve the requested content from the second repository and, if the requested content is unavailable from the second repository, a third attempt to retrieve the requested content from the third repository.

14. The method as in claim 13, wherein the selected portions of the third content stored in the second repository are identified as popularly retrieved content from the third repository to multiple communication devices.

15. The method as in claim 13 further comprising:
replacing a first title of content stored in the second repository with a second title of content stored in the third repository in response to detecting that the second title of content becomes more popularly retrieved amongst multiple communication devices than the first title of content.

16. The multi-tier content distribution system as in claim 1, wherein the portion of the third content is a first portion of the third content; and
wherein a second portion of the third content in the third repository is unavailable from the first repository, the second portion of third content also being unavailable from the second repository.

17. The multi-tier content distribution system as in claim 16, wherein the content management hardware is operable to update the second content stored in the second repository to store the first portion of third content in response to detecting a trend of users retrieving the first portion of third content stored in the third repository.

18. The multi-tier content distribution system as in claim 17, wherein the first portion of the third content stored in the second repository is identified by the content management hardware as popular content retrieved and distributed from the third repository.

19. The multi-tier content distribution system as in claim 18, wherein the first content in the first repository and the second content in the second repository are pre-formatted for on-demand distribution; and wherein the third content stored in the third repository requires formatting into retrievable segments prior to distribution.

20. The multi-tier content distribution system as in claim 19, wherein the third content stored in the third repository requires generation of content access information indicating an order in which to sequentially retrieve the multiple retrievable segments prior to distribution.

21. The multi-tier content distribution system as in claim 1, wherein the first content stored and distributed from the first repository and the second content stored and distributed from the second repository are pre-processed into retrievable segments and corresponding content access information indicating an order in which to retrieve the retrievable segments.

22. The multi-tier content distribution system as in claim 21, wherein the third content stored in the third repository requires generation of content access information indicating an order in which to sequentially retrieve multiple retrievable segments of the third content.

23. The multi-tier content distribution system as in claim 8, wherein the second title of content stored in the second repository as a replacement to the first title of content is pre-processed into retrievable segments and corresponding content access information indicating an order in which to retrieve the retrievable segments.

24. The multi-tier content distribution system as in claim 8, wherein the second title of content stored in the third repository requires generation of respective content access information indicating an order in which to sequentially retrieve respective portions prior to distribution.

25. The multi-tier content distribution system as in claim 1 further comprising:

an access control resource operable to attempt retrieval of requested content in accordance with a predefined order in which the access control resource: first attempts to retrieve the requested content from the first repository and, if the requested content is unavailable from the first repository, second attempts to retrieve the requested content from the second repository and, if the requested content is unavailable from the second repository, third attempts to retrieve the requested content from the third repository.

26. The multi-tier content distribution system as in claim 25, wherein the content management hardware is operable to update the second content stored in the second repository using the third content stored in the third repository depending on a trend of users retrieving portions of the third content stored in the third repository; and wherein the content management hardware is operable to replace a first title of content stored in the second repository with a second title of content stored in the third repository in response to detecting that the second title of content becomes more popularly retrieved than the first title of content.

27. The method as in claim 12, wherein the access order indicates to first attempt delivery of the content from the primary repository and, after a determination that the content is not available from the primary repository, second attempt delivery from the first supplemental repository; and wherein the access order indicates to attempt delivery from a second supplemental storage resource after a determination that the content is not available from the first supplemental repository.

28. The multi-tier content distribution system as in claim 7, wherein the first computer processor hardware distributes the content as indicated by the request to the communication device from an accessed repository amongst a combination of the first repository, the second repository, and the third repository, depending on which accessed repository is first determined as storing the content as indicated by the request.

29. A multi-tier content distribution system comprising:

a first repository from which to distribute first content;

a second repository from which to retrieve and distribute second content, the second repository storing the second content and being an alternative storage resource with respect to the first repository from which to distribute content not available in the first repository, the second content different than the first content;

a third repository from which to distribute third content, the third repository being an alternative storage resource with respect to the second repository from which to retrieve and distribute respective content that is unavailable from the second repository; and content management hardware to selectively populate the second repository with the second content, the second content including a portion of the third content stored in the third repository;

a content retrieval resource, the content retrieval resource receiving a request for content from a communication device, the content retrieval resource attempting retrieval of the requested content in an ordered sequence from: i) the first repository as an initial attempt to retrieve the requested content, ii) the second repository if the requested content is determined to be unavailable from the first repository, and iii) the third repository if the requested content is determined to be unavailable from the second repository; and the content retrieval resource communicating the requested content to the communication device regardless of which repository the requested content is retrieved.

30. The multi-tier content distribution system as in claim 1 further comprising:

a content distribution resource that receives a request for content from a communication device;

wherein the content distribution resource, in accordance with an ordered sequence, receives the requested content from one repository of a group of repositories including the first repository, the second repository, and the third repository; and wherein the content distribution resource communicates the requested content to the communication device.

31. The multi-tier content distribution system as in claim 30 further comprising:

a first content server;

a second content server; and wherein the ordered sequence includes:

i) the content distribution resource initiating retrieval and distribution of the requested content from the first repository, ii) the content distribution resource communicating with the first content server to retrieve the requested content, the first content server initiating retrieval of the requested content from the second repository in response to a condition in which the requested content is unavailable from the first repository, and iii) the first content server communicating with the second content server, the second content server initiating retrieval of the requested content from the third repository in response to a condition in which the requested content is unavailable from the second repository.

32. The multi-tier content distribution system as in claim 31, wherein both the first content in the first repository and the second content in the second repository are pre-formatted for on-demand distribution; and wherein the third content requires formatting by the second server prior to distribution.

33. The multi-tier content distribution system as in claim 31, wherein the content management hardware stores the portion of the third content in the second repository in response to popularity information indicating that the portion of third content is currently popular, the portion of third content replacing previously stored content in the second repository.

* * * * *